March 18, 1941.  M. C. JACOBS  2,235,483
RODENT TRAP
Filed Sept. 25, 1940   2 Sheets-Sheet 1

Inventor
Marion C. Jacobs
By Clarence A. O'Brien
Attorney

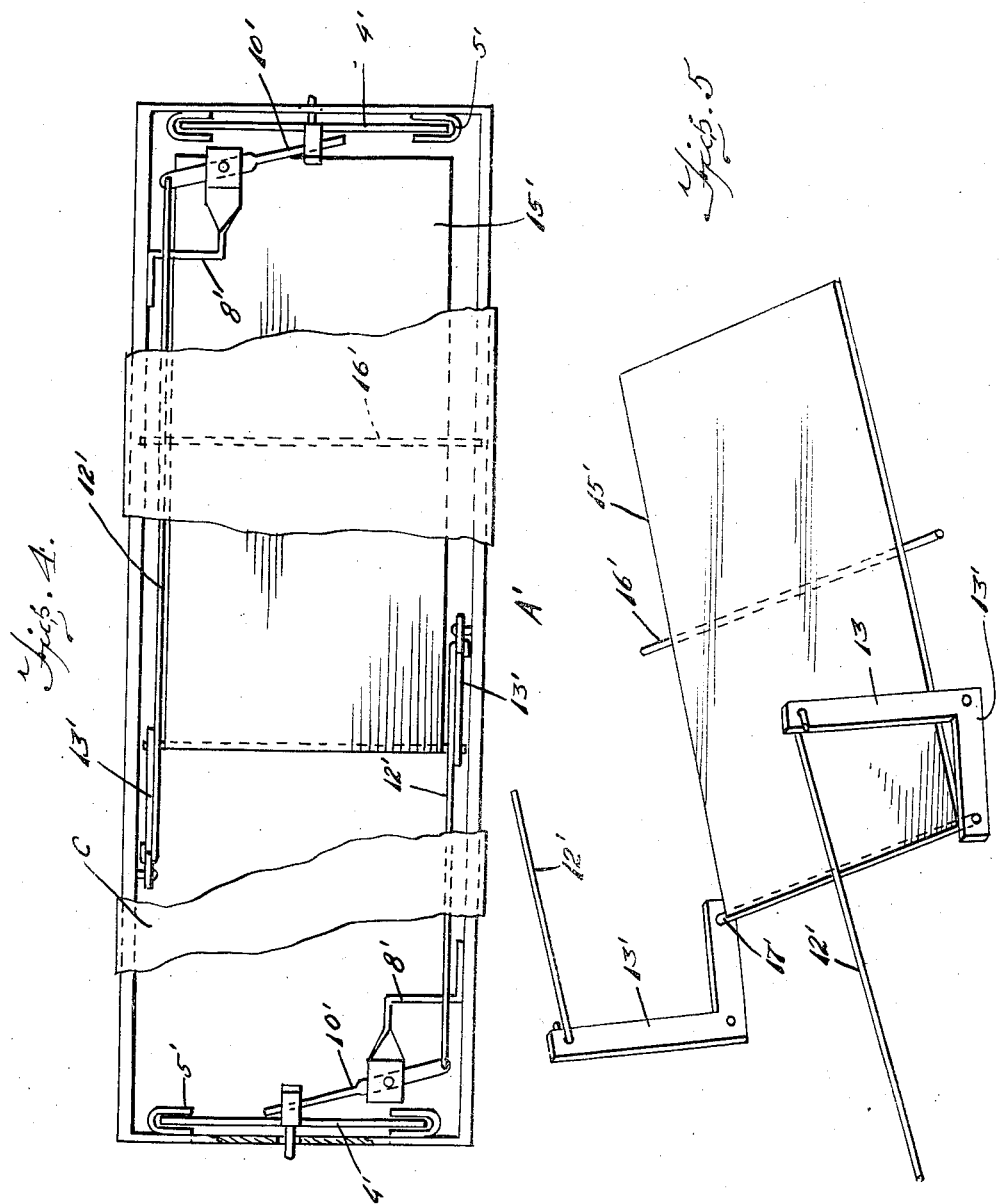

Patented Mar. 18, 1941

2,235,483

UNITED STATES PATENT OFFICE 2,235,483

RODENT TRAP

Marion C. Jacobs, La Porte City, Iowa

Application September 25, 1940, Serial No. 358,350

3 Claims. (Cl. 43—61)

This invention relates to a rodent trap, the general object of the invention being to provide a vertically movable door for closing an opening at one end of the trap, a trigger for holding the door in open position and means operated by a tiltable platform for releasing the trigger when the platform is moved by a rodent walking into the trap.

Another object of the invention is to provide a trap with a door at one end thereof for catching mice and other small animals and a larger trap having a sliding door in each end thereof with means for releasing the triggers of both doors by a tiltable platform when a rat or a larger animal enters the trap.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 4 is a top plan view of the rat trap, this view showing parts of the cover broken away and a part of one end in section.

Figure 5 is a perspective view of the platform of the trap shown in Figure 4 with the angle-shaped members actuated by tilting movement of the platform for releasing the triggers of the doors.

Figure 1:
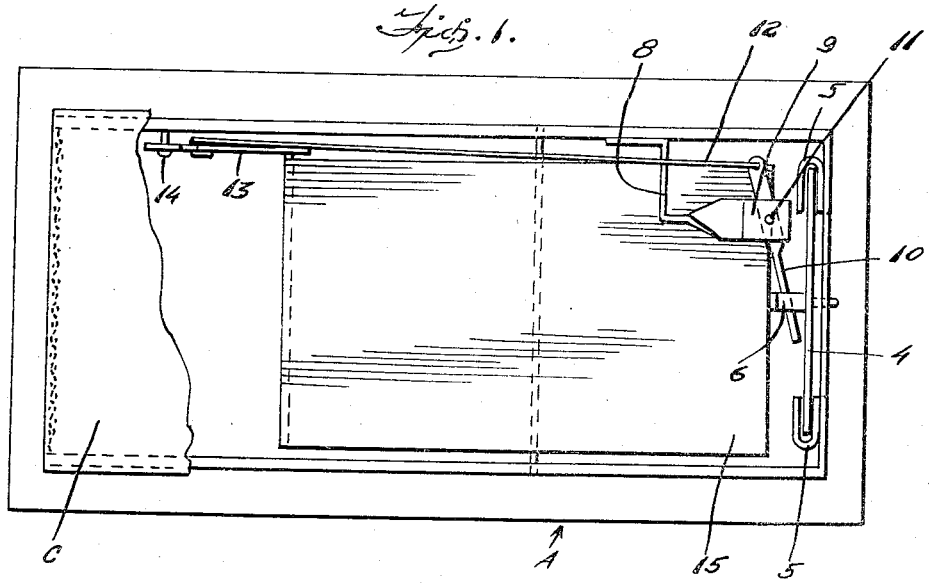
Figure 1 is a top plan view of a mouse trap with most of the cover broken away.
Figure 2:
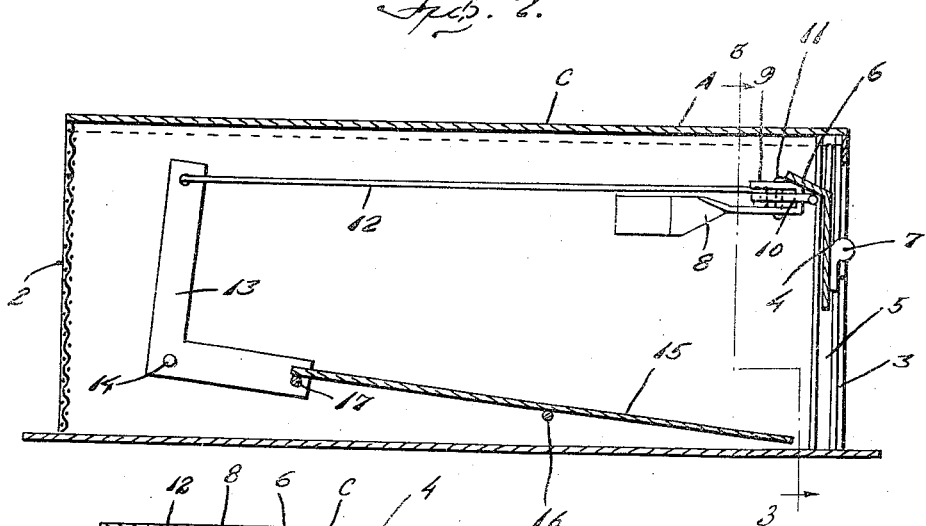
Figure 2 is a vertical longitudinal sectional view through Figure 1.
Figure 3:
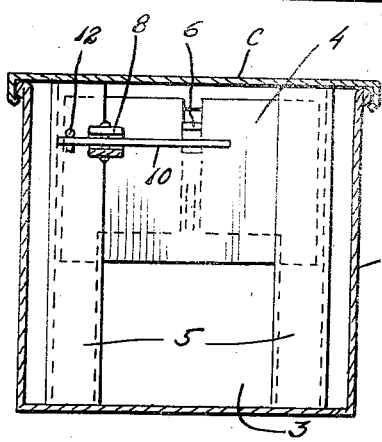
Figure 3 is a transverse sectional view through Figure 2 the section being taken on line 3—3 of Figure 2.

Referring to Figures 1, 2 and 3, the letter A indicates a box-like trap having one end closed by wire mesh 2 and its other end having an opening 3 therein and this opening is adapted to be closed by a vertically movable door 4, the side edges of which operate in the channel-shaped guide members 5 located in the front portion of the trap at the inner edge of the front thereof. An upwardly and inwardly extending member 6 is connected with the top of the door and a handle 7 is connected to the outer face thereof whereby the door can be lifted. A substantially Z-shaped bracket 8 has one end connected to an inner wall of a side of the trap and its other end is flat and bent into channel shape as shown at 9 and a trigger lever 10 is pivoted in the channel of this part by a pin 11. One end of the trigger is adapted to pass under the projection 6 to hold the door in open position and the other end is attached to a rod 12. The rod extends rearwardly and is connected to the upper end of an L-shaped or angle-shaped lever 13 pivoted to a side wall of the trap as shown at 14. A platform 15 is supported for rocking movement in the lower part of the trap by a rod 16 fastened to the under face of the platform intermediate the ends thereof with the ends of the rod passing through holes in the sides of the trap. A pin 17 is carried by the lower arm of the lever 13 and the rear end of the platform normally rests upon the same.

When the door is raised the parts assume the position shown in Figure 2 so that a mouse or other animal can enter through the opening 3 and walk upon the platform 15 and when it passes beyond the rod 16 its weight will tilt the platform so that a rocking movement is imparted to the lever 13 and this causes the rod 12 to move the trigger lever 10 to releasing position so that the door will drop and thus trap the rodent in the trap.

Figure 4 shows a trap made for rats and similar size animals and as shown in this figure the body A' of the trap which is also of box shape has an opening in each end thereof, each opening being adapted to be closed by a vertically movable door 4' operated in the guideways 5' and each door is held in raised position by the trigger lever 10' pivoted to the bracket 8'. Both doors are adapted to be released by tilting movement of the platform 15' tiltably supported in the trap by the rod 16' and a rod 17' is fastened to the inner end of the platform and engages a pair of L-shaped levers 13', one of which is pivoted to one side wall of the trap and the other to the opposite side wall and these levers are oppositely arranged as shown in Figure 5. Rods 12' connect these levers to the two trigger levers 10' of the two doors so that when a rat walks upon the platform and tilts the same both levers 13' are rocked to cause the rods 12' to release the trigger levers so that both doors will drop and thus entrap the animal.

As will be seen my invention uses no springs which are liable to get out of order and the trap can be easily set and can be manufactured to sell at low cost. Each trap has its top closed by a sliding cover C.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a trap of the class described having an opening in one end, a vertically movable door for closing the opening, a trigger member for holding the door in raised position, a tiltable platform in the lower part of the trap tilted by an animal or rodent walking over the same and means for moving the trigger member to releasing position by movement of the platform, said means including an L-shaped lever pivoted to a side wall of the trap, a projection on the lower end of the lever upon which the platform rests at its inner end and a rod connecting the upper end of the L-shaped lever with the trigger member.

2. In a trap of the class described, a vertically movable door closing an opening in a wall of the trap, a tiltable platform in the trap upon which a rodent will walk as it enters the trap, a projection on the door, a bracket in the trap, a trigger lever pivoted to the bracket and having one end passing under the projection to hold the door in raised position, an L-shaped lever pivoted to a side wall of the trap, a rod connecting the upper end of the lever to the trigger lever, and means for rocking the L-shaped lever to release the trigger lever by tilting movement of the platform.

3. In a trap of the class described, a box-like body having an opening in each end thereof, sliding doors for closing the openings, trigger means for holding the doors in raised position, a tiltable platform in the trap, a pair of L-shaped levers pivoted to opposite side walls of the trap, a rod connecting the lower ends of the levers together and upon which the inner end of the platform rests, and rods connecting the upper ends of the L-shaped levers to the trigger levers.

MARION C. JACOBS.